Dec. 16, 1958 J. C. BRUMFIELD 2,864,911
MECHANISM FOR MOTOR OPERATION OF A CIRCUIT BREAKER
Filed June 23, 1955 3 Sheets-Sheet 1
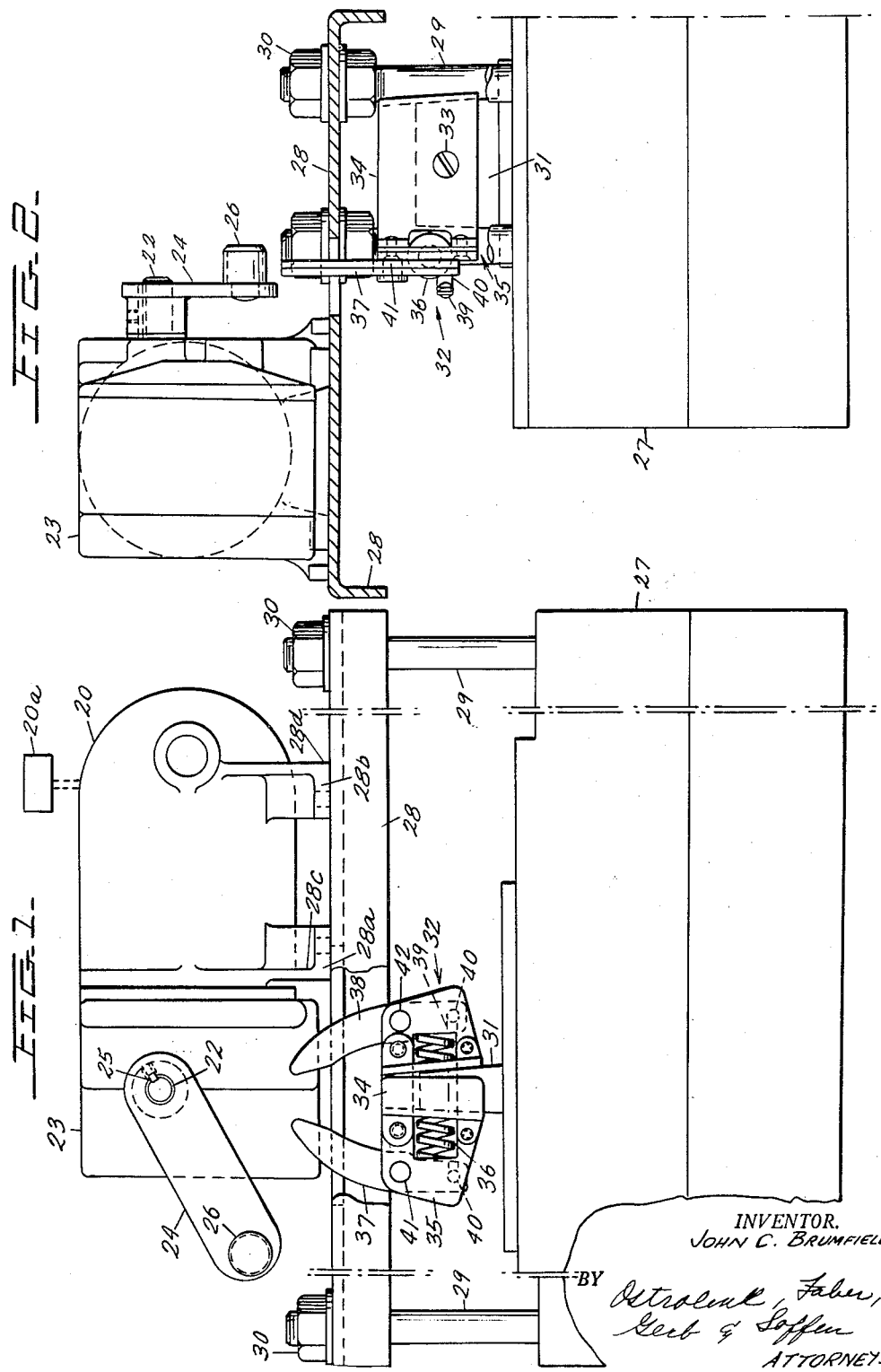
INVENTOR.
JOHN C. BRUMFIELD
BY Ostrolenk, Faber,
Gerb & Soffen
ATTORNEYS Dec. 16, 1958   J. C. BRUMFIELD   2,864,911
MECHANISM FOR MOTOR OPERATION OF A CIRCUIT BREAKER
Filed June 23, 1955   3 Sheets-Sheet 2
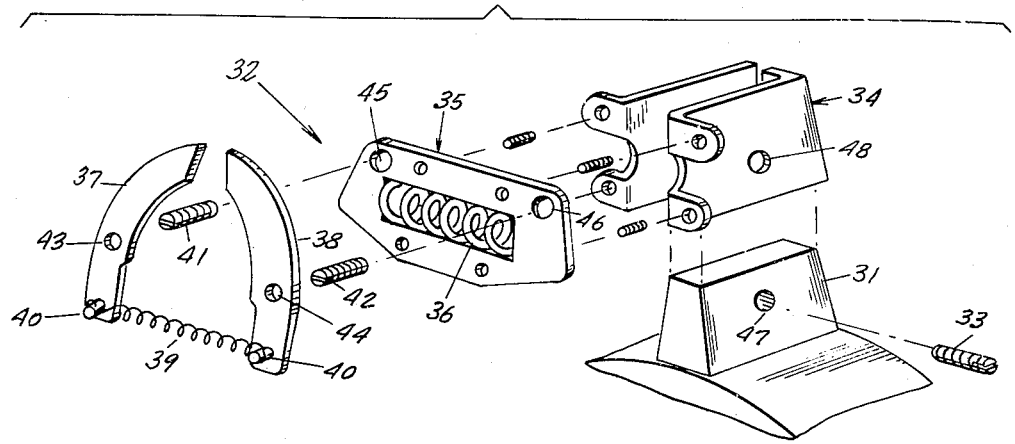
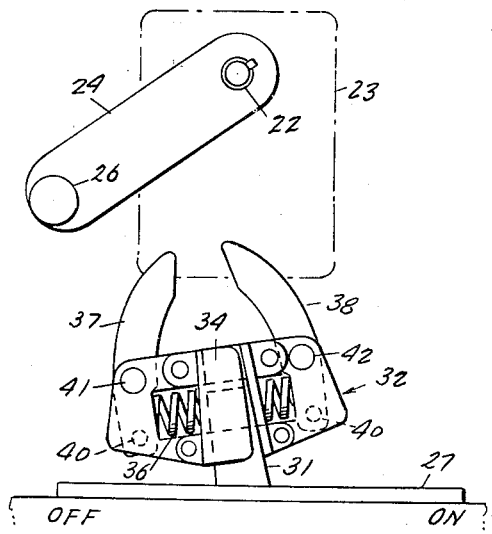
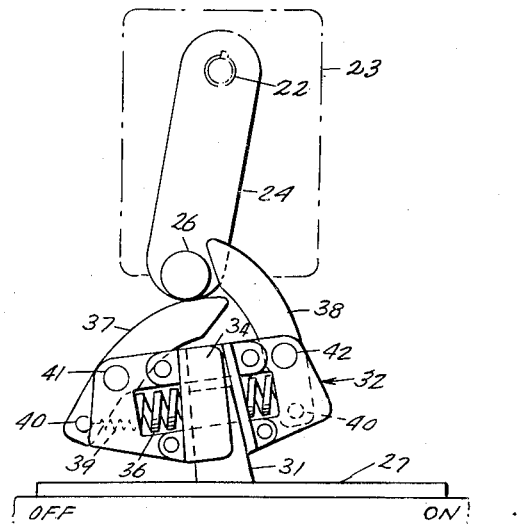
INVENTOR.
JOHN C. BRUMFIELD
BY *Ostrolenk, Faber,*
*Gerb & Soffen*
ATTORNEYS Dec. 16, 1958   J. C. BRUMFIELD   2,864,911
MECHANISM FOR MOTOR OPERATION OF A CIRCUIT BREAKER
Filed June 23, 1955   3 Sheets-Sheet 3
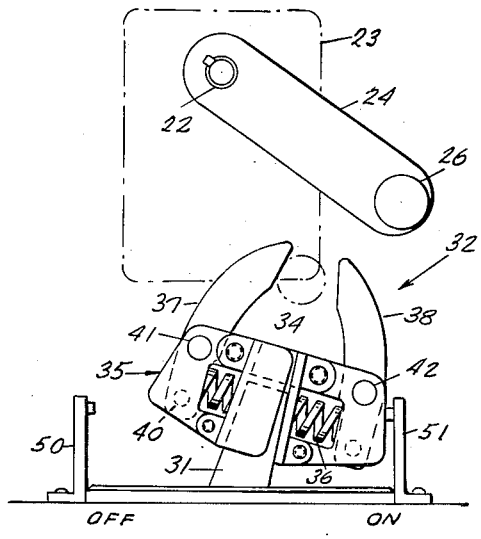
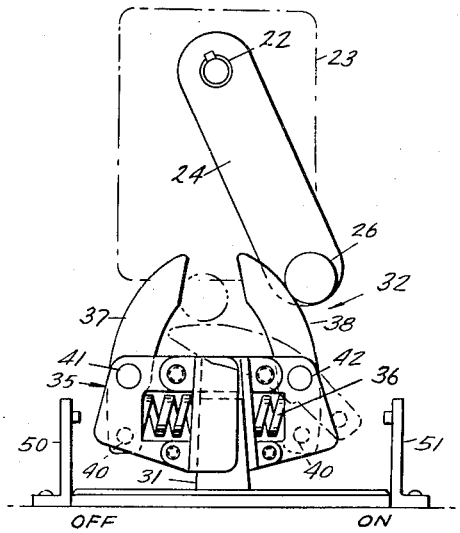
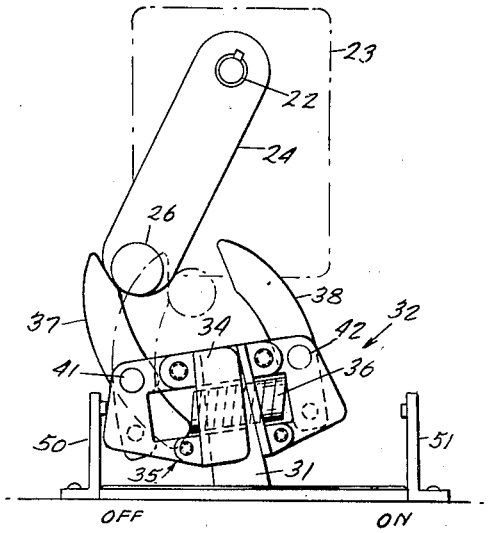
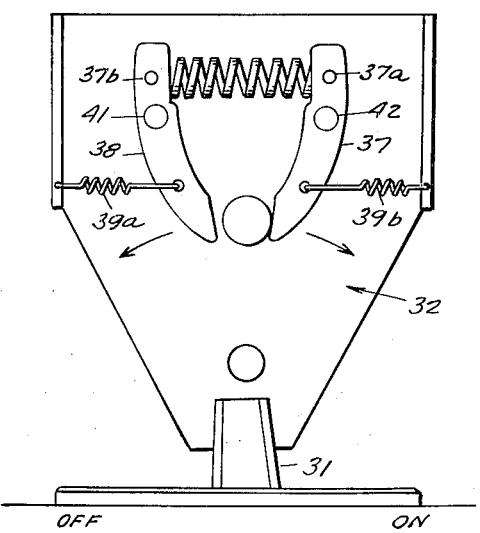
INVENTOR.
JOHN C. BRUMFIELD
BY Ostrolenk, Faber,
Gerb & Soffen
ATTORNEYS

United States Patent Office 2,864,911
Patented Dec. 16, 1958

2,864,911

MECHANISM FOR MOTOR OPERATION OF A CIRCUIT BREAKER

John C. Brumfield, Philadelphia, Pa., assignor to I-T-E Circuit Breaker Company, Philadelphia, Pa., a corporation of Pennsylvania Application June 23, 1955, Serial No. 517,593

6 Claims. (Cl. 200—92)

My invention relates to a motor operated mechanism for circuit breakers, and more particularly to a motor operated mechanism for the operation of a circuit breaker handle wherein the motor operated mechanism is connected ot the circuit breaker handle for operation thereof, and is thereafter automatically disconnected from the circuit breaker handle.

My novel invention represents an improvement over the motor operated mechanism which is disclosed in copending application Serial No. 517,521, filed June 23, 1955, assigned to the assignee of the instant invention, wherein a reversible motor having a torque limited motor was used as the motor operated mechanism for circuit breakers. In this application a torque limited motor was necessary to prevent breakage of the operating handle or the circuit breaker mechanism after the reversible motor has moved the circuit breaker handle to an extreme position.

As will be shown, I now provide a linkage between the reversible motor and the circuit breaker handle which is constructed to allow automatic disconnection between the reversible motor and the circuit breaker handle after operation thereof to an extreme position.

In circuit breakers of the type to which my novel invention may be applied, contacts are operatively connected to the operating handle to be engaged and disengaged responsive to the movement of an operating handle to a first and second extreme position. The mechanism which operatively connects the operating handle and cooperating contacts usually has the following characteristics:

(1) Engagement or disengagement of the contacts is effected just before the operating handle assumes its corresponding extreme position. It should be noted, however, that my novel motor operated mechanism can be applied to circuit breakers in which the motion of the contacts either into or out of engagement is a direct function of the motion of the operating handle.

(2) A means is provided to maintain the contacts in the engaged or disengaged position after they assume this position. This maintaining means can be embodied in devices such as over center toggle systems, latches and many others which are well known in the art.

(3) The mechanism can have trip free properties to allow separation of the contacts when engaged on a fault condition independently of the operating handle position.

(4) Means are provided within the mechanism to allow contact operation independently of the position of operating handle which are responsive to fault or predetermined conditions. In most cases, the operating handle will also be biased to assume a tripped position upon contact operation responsive to the fault sensing means.

(5) An extremely important feature common to most circuit breakers is that the operating handle cannot move beyond either of its two extreme positions without breakage of either the handle, the casing upon which the handle is mounted, the mechanism connecting the operating handle to the contacts, or any of the associated components of the circuit breaker.

In view of the above properties, the motor operated mechanism of my invention has the following features:

(1) Rotation of the reversible motor in a first direction will cause motion of the operating handle to a first extreme position for contact engagement of the circuit breaker contacts and rotation of the reversible motor in a second direction will cause motion of the operating handle to a second direction for contact disengagement. In each case the rotation of the motor will transmit sufficient torque to overcome the forces maintaining the contacts in the engaged or disengaged position.

(2) When a circuit breaker operating handle assumes an extreme position the motor will be automatically disconnected from the circuit breaker operating handle. Therefore, continued rotation of the motor will not cause breakage of the operating handle or any of the associated parts of the circuit breaker.

(3) Upon automatic operation of the circuit breaker contacts due to fault conditions, the motor mechanism can be operated to bring the circuit breaker handle to an extreme position to reset the operating mechanism and then rotate in a reverse direction to reclose the circuit breaker contacts.

However, as will be shown hereinafter, a slight structural modification which is still within the principle of my invention, will allow the circuit breaker handle to move to a third position or trip position in view of the novel type of removably connecting means used in connecting the reversible motor and the circuit breaker operating handle.

Clearly, a removable connection provides the important advantage of a visual indication by means of the circuit breaker operating handle as to whether the circuit breaker contacts are opened, closed, or tripped due to predetermined conditions.

Motor operated circuit breakers and mechanism are well known in the art, and in each case a motor having a single direction of rotation is connected through a complex oscillatory linkage to energize the operation of a circuit breaker handle. Since the circuit breaker will go through another operating sequence if the motor is allowed to continue rotating, elaborate electrical circuits and brake mechanisms are required to de-energize the motor rotation after operation of the circuit breaker handle to a desired position.

The devices of the prior art also require elaborate clutching mechanisms to attach the motor to the circuit breaker handle in order to allow a convenient means of disconnection for subsequent manual operation. These devices are typically shown in United States Patents 2,192,046, 2,228,466 and 2,354,135.

If a motor having only a unidirectional rotation is used to be the prime mover for the motor operated circuit breaker operation, there is an inherent need for a brake on the motor to prevent the circuit breaker handle or circuit breaker casing from breakage due to the rotational energy in the motor rotor after operation of the circuit breaker handle. A complicated electric circuit is also needed to assure deenergization of the motor to prevent the continued motor rotation from causing a subsequent operation of the circuit breaker.

Clearly, if there is a failure in the electric circuit which de-energizes the motor rotation, then the circuit breaker will be reoperated which could cause the destruction of the circuit breaker or any number of dangerous conditions on the line being protected by the circuit breaker. Furthermore, if the complex linkage which transforms the unidirectional rotary motion of the motor to the oscillatory motion required by the circuit breaker handle fails, then it would either be impossible to operate the circuit breaker or the circuit breaker handle or casing would be fractured.

The principle of my invention as was above noted, is to use a reversible motor which is removably connected, by a connecting means, to the operating handle of the circuit breaker in such a manner to allow force transmission from the reversible motor to the circuit breaker handle for operation within the two extreme positions of the circuit breaker handle, and to automatically disconnect the reversible motor from the operating handle after the operating handle has been moved to an extreme position. This novel connection between the motor and circuit breaker handle is now made possible since the rotary motion of the motor in either directions can be linked on a simple manner to the circuit breaker handle to thereby operate the circuit breaker handle towards a first or second direction. Hence, there is no need, in view of the use of a motor which can rotate in two directions, to convert a unidirectional rotary motion which is given by a motor having only one direction of rotation to the oscillatory motion which could be a straight line motion as required by the circuit breaker handle.

Since the operating mechanism is now disconnected from the circuit breaker handle after motion thereof to an extreme position, the possibility of breakage of either the circuit breaker handle or its associate mechanism is clearly avoided.

If desired, limit switches which would automatically de-energize the motor in response to the positioning of the circuit breaker handle in an extreme position could be provided. In view of my novel connection, however, which automatically disengages the circuit breaker handle and reversible motor after the circuit breaker handle is moved to an extreme position, continued rotation of the reversible motor in a given direction will merely cause engagement between the reversible motor and the circuit breaker handle which is immediately disconnected after they engage.

It is now clear that each of the above difficulties occurring in the prior art devices is overcome with this novel motor operated mechanism. The complex brake is abandoned in view of the disconnecting feature between the motor and circuit breaker operating handle after operation thereof. The complex linkages which were required to change the unidirectional motion of the motor to the oscillatory motion required by the circuit breaker handle are now avoided.

A further simplification provided with my novel motor operated mechanism is that the connection between the reversible motor and the operating handle can be simple to thereby allow manual operation of the circuit breaker after a simple disconnection of the connecting means, or to embody my principle in a manner such that the reversible motor will be completely removed from the operating handle after operation thereof.

Clearly, this eliminates the necessity of a complex clutch as was used in the prior art devices to allow either manual or motor operation of the circuit breaker handle. This simple and inexpensive connection between the motor and the circuit breaker handle provides the further advantage of offering a clear visual indication of the position of the circuit breaker handle, whereas in the more complex devices using unidirectional motors a visual indication was often obstructed by the complex linkages connecting the circuit breaker handle and the unidirectional motor.

It is to be noted that the invention disclosed in this application differs from the invention disclosed in co-pending application Serial No. 517,594, filed June 23, 1955, in that the motor operated mechanism of the instant invention is completely removed or automatically disconnected from the circuit breaker handle after operation thereof. In the co-pending application, however, a distinct operative connection exists at all times unless physically disconnected, but the operative connection is so constructed as to transmit force from the motor operated mechanism to the circuit breaker handle over the range of motion of the circuit breaker handle and to thereafter be a non-force transmitting connection.

Accordingly, a primary object of my invention is to provide a motor operated mechanism for circuit breakers wherein the motor operated mechanism is connected to the circuit breaker handle for operation thereof and is thereafter automatically disconnected from said circuit breaker handle.

Another object of my invention is to provide an operating mechanism for circuit breakers which does not require a clutch, brake or complex electrical de-energizing circuits.

Another object of my invention is to provide a motor operated mechanism for circuit breaker handles wherein manual operation of the circuit breaker handle is afforded without any alteration of the mechanism.

Another object of my invention is to provide a motor operated mechanism for a circuit breaker handle such that continued rotation of the driving motor will not cause breakage of the circuit breaker handle or its associated mechanism after the circuit breaker handle is moved to an extreme position.

A still further object of my invention is to provide a motor operated mechanism for circuit breaker handle which will give a visual indication of the circuit breaker handle being in a first or open position, a second or closed position or a third or tripped position.

Another object of my invention is to provide a motor operating mechanism for circuit breakers wherein an operative connection between the motor and the circuit breaker is capable of transmitting force only over the range of motion of the circuit breaker handle.

Still another object of my invention is to provide a motor operated mechanism for a circuit breaker having a simple linkage between a reversible motor and the circuit breaker handle and the reversible motor to thereby afford manaul operation of the circuit breaker.

Obviously the reversible motor of my invention can be replaced by a unidirectional motor wherein a reversing means such as a gear box can be interposed between the motor and an output shaft such that an energizing means will operate the motor and also operate the reversing means to obtain a selectively reversible rotation of the motor output shaft. Accordingly, another object of my invention is to provide a motor having a reversible output shaft for operating the operating handle of a circuit breaker.

Circuit breakers with which my invention has its greatest application are of the type in which the circuit breaker handle performs an essentially linear motion. Accordingly another object of my invention is to provide a motor operating mechanism for circuit breakers having an operating handle which performs a substantially straight line motion.

These and other objects of my invention will become apparent when taken in connection with the drawings, in which:

Figure 1 shows a front view of an embodiment of my novel invention wherein a reversible motor and a circuit breaker handle are removably connected.

Figure 2 shows a side view of the embodiment of Figure 1.

Figure 3 shows an exploded perspective view of a portion of the connecting means which is used in the embodiment of Figures 1 and 2.

Figure 4 shows the position of the component of Figures 1 to 3 when the circuit breaker handle is in the off position and is about to be driven to the on position.

Figure 5 is similar to Figure 4, and shows the position of the connecting means immediately prior to going from the off position to the on position.

Figure 6 is similar to Figure 4, but shows the circuit breaker handle in the on position and about to be driven to the off position.

Figure 7 is similar to Figure 4, and shows the circuit breaker in a tripped position and about to be reset or moved to the off position by an extension on the reversible motor shaft.

Figure 8 is similar to Figure 7 immediately after the circuit breaker handle has been driven from the tripped position to the reset or off position.

Figure 9 shows a second embodiment which may be used for an automatically removable connecting means.

Referring first to Figure 1 which shows an embodiment of my novel invention, a reversible gear motor 20 drives a shaft 22 through a gear box 23 and shaft 22 subsequently rotates a first member which can be a crank arm 24. Rotation of output shaft 22 by means of the motor 20 can be selectively energized by an energizing means shown schematically by box 20a. Box 20a would, of course, contain a power source and various switching apparatus which could be easily designed by anyone skilled in the art. In the case of motor 20 being a unidirectional motor, box 20 would also contain means to operate a reversing gear box through which shaft 22 would be reversibly rotated. The crank arm 24 can, if desired, be fastened to shaft 22 by means of the key 25. Crank arm 24 then carries at its extreme end a roller 26 which is rotatably mounted on the crank arm 24. The entire motor assembly of the motor 20 is then maintained in a position with respect to the circuit breaker, shown generally as the circuit breaker 27.

Although this could be done in any desired manner, the embodiment of Figure 1 and Figure 2 shows motor 20 being mounted upon circuit breaker 27 by means of a support member 28. The reversible gear motor itself is maintained on support plate 28 by a means which could be the screw means at locations 28a and 28b where the legs 28c and 28d of motor 20 are maintained to support plate 28. Support plate 28 is securely fastened to the circuit breaker 27 by means of studs 29 and nuts 30 in the manner shown in the figure.

Circuit breaker 27 has a protruding operating handle 31 which is operatively connected to a pair of cooperable contacts within circuit breaker by means which is not shown herein. Details of this construction, however, are typically shown in U. S. Patent No. 2,574,093. Although I show my novel motor operating mechanism in conjunction with a circuit breaker of this type, it will become apparent that my motor operated mechanism can be applied to any circuit breaker having an operating handle.

A second member which is shown generally as member 32 is then fastened to operating handle 31 by any convenient means and is shown in the drawings of Figure 1 and Figure 2 as being fastened by means of a screw 33. As will be more clearly described hereinafter, the second member 32 will be engaged by the roller of crank arm 24 for a portion of the rotation of crank arm 24 to thereby drive the circuit breaker handle between the on, off, or reset positions. The second member 32 is shown more specifically in the exploded perspective of Figure 3 as comprising a body 34, spring retaining plate 35, a first biasing spring 36 which is inserted within the opening of the spring retaining plate 35, a first finger 37 and a second finger 38. As shown specifically with reference to Figures 1 and 3, it is clearly seen that the first finger 37 and the second finger 38 are pivotally mounted upon the spring retaining plate 35 by means of the pivotal supports 41 and 42, which are mounted within cooperating holes 43 and 44 on the first and second fingers 37 and 38 respectively and the holes 45 and 46 respectively on the spring retaining plate 35. The body 34 is so constructed as to cooperate with the shape of the circuit breaker operating handle 31, and the assembled member 32 is mounted upon the circuit breaker handle 31 and fastened thereto by means of the screw 33 which cooperates with a hole 47 on the circuit breaker handle 31 and a hole 48 on the body 34 of second member 32.

It is now obvious that as crank arm 26 rotates in a counter-clockwise direction from the position shown in Figures 1 and 2, the roller 26 will first engage the first finger 37. This finger 37 is biased to resist a clockwise rotation which would be imparted to it by roller 26 moving in a counter-clockwise rotation only by the relatively weak spring 39. The finger will therefore flex without transmitting a force to the circuit breaker handle 31 and the roller 26 upon continued rotation of crank arm 24 will subsequently engage the second finger 38. The second finger 38 is strongly biased to resist a clockwise rotation since it impinges upon first biasing spring 36 and therefore transmits a force to the circuit breaker operating handle 31 for motion in the right hand direction. This biasing spring 36, however, is sufficiently flexible to allow clockwise rotation of second finger 38 about pivot point 42 when the motion of the circuit breaker handle 31 is moved to a maximum position to the right. Therefore, continued rotation of the crank arm 24 and roller 26 in counter clockwise direction will cause compression of the first biasing spring 36 when the operating handle 31 can no longer travel to the right, and the roller 26 will then be completely released from the second finger 38 and continue its counter clockwise rotation until motor 20 is de-energized.

For rotation of the cranks arm 24 in a clockwise direction, a similar sequence of operation of the fingers 37 and 38 will occur with the operation of fingers 37 and 38 being reversed and motion of the circuit breaker handle 31 being towards the left rather than towards the right.

The operation of this novel device can now be more specifically described by referring first to Figure 4 which shows the circuit breaker operating handle 31 in the off position, prior to engagement between the roller 26 of crank arm 24, which is rotating in a counter clockwise direction to subsequently drive the circuit breaker handle 31 to an on position. As is shown in Figure 4 and Figure 5, the roller 26 first engages the first finger 37. Since finger 37 is lightly biased by means of the second biasing spring 39 against rotation in a clockwise direction, it flexes to thereby release roller 26 without imparting any force to the circuit breaker handle 31; continued rotation of crank arm 24 subsequently brings the roller 26 into engagement with the second finger 38 as shown specifically in Figure 5. However, the second finger 38 is biased to resist clockwise rotation about point 42 by a relatively strong spring 36. Therefore, the continued rotation of roller 26 in the counter clockwise direction will move the second finger 38 towards the right since this finger will not pivotally rotate about pivot point 42, and accordingly the circuit breaker handle 31 will be moved to the on position to the extreme right.

The circuit breaker handle 31 and the second mechanism 32 are shown at the extreme right hand position and in the on position in Figure 6. Clearly, as soon as the circuit breaker operating handle 31 has assumed this extreme right hand position, further movement of the circuit breaker handle 31 towards the right is rigidly resisted in a manner which is well known in the circuit breaker art.

One example of a means to limit the motion of this circuit breaker handle would be to allow it to come into engagement with the casing of circuit breaker 27 within which the operating handle 31 is pivotally mounted.

Since movement of the circuit breaker operating handle 31 is restricted, continued rotation of the crank arm 24 in a clockwise direction will cause roller 26 to rotate the second finger 38 in a clockwise direction about pivot point 42 and cause compression of the spring 36 to thereby allow roller 26 to completely disengage the second finger 38.

When the circuit breaker handle 31 is in the on position as shown in Figure 6, it may be driven to the off position in the following manner; the reversible gear motor 20 is energized in such a manner as to cause a clockwise rotation of the crank arm 24 and its associated roller 26. As clearly seen in Figure 6, this clockwise rotation will bring the roller 26 into engagement with first finger 37. However, a counter clockwise rotation of the first finger 37 is prohibited by the relatively strong spring 36 which is attached to the operating handle 31. Therefore, the roller 26 will drive the operating handle to an extreme left or on position. Similarly, when the circuit breaker handle 31 has assumed this extreme left position, means are present to prevent it from moving any further and the first finger 37 will be rotated counter clockwise about pivot point 41 to thereby release roller 26 from the finger 37 upon further rotation of the crank arm 24 in a clockwise direction.

It should be noted at this time, that a continued rotation of the crank arm in either the clockwise or counterclockwise direction after operating the operating handle 31 to the on or off position respectively, will in no way harm the circuit breaker or cause a subsequent operation of the circuit breaker. That is, when the circuit breaker operating handle 31 is in the extreme right hand position, or the on position, a continued counter clockwise rotation of crank arm 24 and its associated roller 26 will merely bring it into contact with the left hand surface of the second finger 38, rotate finger 38 about pivot point 42 in opposition to the spring bias 36, and then release the finger 38.

In this operation it is clear that a reoperation of the circuit breaker does not occur. Furthermore, breakage of the circuit breaker handle 31 or the means which maintains the circuit breaker handle 31 from moving beyond the extreme right hand position does not occur since the finger 38 rotates to compress the relatively strong spring 36 to thereby release the engagement between the roller 26 and the finger 38.

It is obvious that similar remarks follow with respect to a continued clockwise rotation of the crank arm 24 of the reversible gear motor 20. Therefore, an operator merely has to energize rotation of the crank arm 24 of gear motor 20 to bring the circuit breaker handle 31 into a desired position and elaborate electrical circuits or brakes to assure de-energization and stopping of the rotation of motor 20 are not required. If desired, limit switches such as the limit switches 50 and 51 may be provided and connected in such a manner as to de-energize the circuit energizing the motor rotation in response to the positioning of circuit breaker handle 31 in the extreme right or extreme left hand position respectively. As above noted however, it is clear that this de-energization responsive to the position of the operating handle is not necessary to practice my invention. However, it may be desirable to provide such devices to release the operator from estimating when the circuit breaker handle 31 has been operated to a desired position, so that immediate de-energization of the electrical circuit which selectively energizes the rotation of crank arm 24 of the gear motor 20 is automatically accomplished.

Figure 7 shows the operating handle 31 in an intermediate position, or tripped position. That is, the circuit breaker 27 can have a means associated with it which, responsive to a predetermined condition, will disengage the cooperable contacts of the circuit breaker and move the circuit breaker handle 31 to a third or tripped position.

Figure 7 shows more specifically the roller 26 of crank arm 24 being moved in a clockwise direction to move the circuit breaker operating handle from its tripped position and into a reset or off position. Clearly, the roller 26 in its rotation, as shown in Figure 7, will first engage the second finger 38. This finger being lightly biased against rotation in a counter clockwise direction about pivot point 42 allows release of the roller 26 without imparting motion to the operating handle 31. The roller 26 subsequently engages the first finger 37, which is strongly biased by spring 36 against counter clockwise rotation. Therefore, the circuit breaker handle 31 is moved to the left into an off or reset position, and the roller 26 subsequently disengages the first finger 37 in a manner previously described.

Figure 8 indicates the operation of my novel invention, when the circuit breaker handle 31 is moved from the tripped position of Figure 7 and into the reset or off position, and clearly indicates the manner in which the roller 26 causes a counter clockwise rotation of finger 37 about pivot point 41 to thereby release the releasable connection between the roller 26 and the finger 37.

An important advantage of the motor operating mechanism of my invention is now apparent, and that is that the circuit breaker handle 31 gives a visual indication of whether the cooperable contacts of the circuit breaker are in the engaged or on position, or the disengaged or off position, or if the cooperable contacts have been disengaged in response to a predetermined condition.

Another and extremely important advantage of my operation, is that the circuit breaker handle 31 can be operated manually without any disconnection of the motor operating mechanism. This has been an extreme disadvantage in the prior art devices, in that the complex operating mechanism has been difficult to free from the circuit breaker handle for manual operation thereof.

Clearly, however, the operating handle 31 of my novel invention is always free of the operating mechanism to thereby allow instant manual operation thereof when the operating mechanism is not energized.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. An operating mechanism for operating a circuit breaker having an operating handle, a pair of cooperable contacts and a maintaining means, said operating handle being opertively connected to said cooperable contacts to move said contacts to an engaged position responsive to motion of said operating handle to a first position and to move said contacts to a disengaged position responsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; said operating mechanism comprising a reversible motor having an output shaft and connecting means constructed to connect said reversible motor shaft to said operating handle, an energizing means constructed to selectively energize said reversible motor to rotate said output shaft in a first or a second direction; said connecting means comprising a first member being moved by said reversible motor output shaft and a second member pivotally mounted on said operating handle and positioned to be removably engaged by said first member for a portion of its rotation, said first member constructed to removably engage said second member to move said operating handle to said first position responsive to rotation of said reversible motor in a first direction and to move said operating handle to said second position responsive to rotation of said reversible motor in said second direction, said second member having biasing means of sufficient rigidity to drive said operating handle against said maintaining means and from said first to said second position and from said second to said first position, said biasing means of said second member having sufficient flexibility to flex when said operating handle is moved into said first or second position and allow said first member to disengage said second member upon further rotation of said first member.

2. An operating mechanism for operating a circuit breaker having an operating handle, a pair of cooperable contacts and a maintaining means, said operating handle being opertively connected to said cooperable contacts to move said contacts to an engaged position responsive to motion of said operating handle to a first position and to move said contacts to a disengaged position responsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; and means responsive to predetermined conditions to move said contacts to a disengaged position and said operating handle to a third position; said operating mechanism comprising a reversible motor having an output shaft and connecting means constructed to removably connect said reversible motor shaft to said operating handle and an energizing means constructed to selectively energize said reversible motor to rotate said output shaft in a first or a second direction; said connecting means comprising a first member being rotatable by said reversible motor output shaft and a second member pivotally mounted on said operating handle being positioned to be removably engaged by said first member for a portion of the rotation of said first member, said first member constructed to removably engage said second member to move said operating handle to said first position responsive to rotation of said reversible motor in a first direction and to move said operating handle to said second position responsive to rotation of said reversible motor in said second direction, said second member having biasing means of sufficient rigidity to drive said operating handle against said maintaining means and from said first to said second position or from said second to said first position, said biasing means of said second member having sufficient flexibility to flex when said operating handle is moved into said first or second position and allow said first member to be disengaged from said second member upon further rotation of said first member; said operating handle being moved from said first position to said third position responsive to operation of said means responsive to predetermined conditions upon the occurrence of said predetermined conditions independently of the position of said first member.

3. An operating mechanism for operating a circuit breaker having an operating handle, a pair of cooperable contacts and a maintaining means, said operating handle being operatively connected to said cooperable contacts to move said contacts to an engaged position responsive to motion of said operating handle to a first position and to move said contacts to a disengaged position responsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; said operating mechanism comprising a reversible motor having an output shaft and connecting means constructed to connect said reversible motor shaft to said operating handle and an energizing means constructed to selectively energize said reversible motor to rotate said output shaft in a first or second direction; said connecting means comprising a first member being rotatable by said reversible motor output shaft and a second member mounted on said operating handle to be removably engaged by said first member for a portion of its rotation, said second member comprising a first and a second pivotally mounted finger, each having a first and a second bias to maintain it in a position for engagement with said first member, said first bias being constructed to impart sufficient rigidity to said second finger to allow rotation of said first member in said second direction to be transmitted to said operating handle for overcoming said maintaining means and moving said operating handle from said second to said first position, said first biases having sufficient flexibility to allow said fingers to flex after said operating handle is moved to said first or second position to thereby allow disconnection between said operating handle and said first member upon continued rotation of said first member; said second bias being constructed to impart sufficient flexibility to said fingers to allow said fingers to flex when engaged by said first member to allow subsequent engagement of a finger having said first bias opposing rotation of said first member.

4. An operating mechanism for operating a circuit breaker having an operating handle, a pair of cooperable contacts and a maintaining means, said operating handle being operatively connected to said cooperable contacts to move said contacts to an engaged position responsive to motion of said operating handle to a first position and to move said contacts to a disengaged position responsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; and means responsive to predetermined conditions to move said contacts to a disengaged position and said operating handle to a third position; said operating mechanism comprising a reversible motor having an output shaft and connecting means constructed to connect said reversible motor shaft to said operating handle and an energizing means constructed to selectively energize said reversible motor to rotate said output shaft in a first or a second direction; said connecting means comprising a first member being rotatable by said reversible motor output shaft and a second member mounted on said operating handle to be removably engaged by said first member for a portion of its rotation, said second member comprising a first and a second pivotally mounted finger each having a first and a second bias to maintain it in a position for engagement with said first member, said first biases being constructed to impart sufficient rigidity to said first finger to allow rotation of said first member in said first direction to be transmitted to said operating handle for overcoming said maintaining means and moving said operating handle from said first to said second position, and to impart sufficient rigidity to said second finger to allow rotation of said first member in said second direction to be transmitted to said operating handle for overcome said maintaining means and moving said operating handle from said second to said first position; said first biases having flexibility to allow said fingers to flex after said operating disconnection between said operating handle and said first member upon continued rotation of said first member; said second bias being constructed to impart sufficient flexibility to said fingers to allow said fingers to flex when engaged by said first member to allow subsequent engagement of a finger having said first bias opposing rotation of said first member; said operating handle being moved from said first position to said third position independently of said operating mechanism responsive to operation of said means responsive to predetermined conditions upon the occurrence of said predetermined conditions.

5. An operating mechanism for operating a circuit breaker having an operating handle, a pair of cooperable contacts and a maintaining means, said operating handle being operatively connected to said cooperable contacts to move said contacts to an engaged position responsive to motion of said operating handle to a first position and to move said contacts to a disengaged position responsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; said operating mechanism comprising a reversible motor having an output shaft and connecting means constructed to connect said reversible motor shaft to said operating handle and an energizing means constructed to selectively energize said reversible motor to rotate said output shaft in a first or second direction; said connecting means comprising a first member movable by said reversible motor output shaft and a second member removably engaged by said first member for a portion of its movement; said second member comprising first and second fingers, first and second biases, and a retaining plate; said first bias being mounted on said retaining plate; said first and second fingers each being pivotally mounted to said retaining plate in operative engagement with said first bias, said second bias being operatively engaged to said first and second fingers; said retaining plate being mounted on said operating handle, said first and second biases operatively maintaining said first and second fingers for engagement by said first member; said first bias being constructed to impart sufficient rigidity to said first finger to allow movement of said first member in said first direction to be transmitted to said operating handle for overcoming said maintaining means and moving said operating handle from said first to said second position, and to impart sufficient rigidity to said second finger to allow movement of said first member in said second direction to be transmitted to said operating handle for overcoming said maintaining means and moving said operating handle from said second to said first position said first bias having flexibility to allow said fingers to flex after said operating disconnection between said operating handle and said first member upon continued movement of said first member; said second bias being constructed to impart sufficient flexibility to said fingers to allow said fingers to flex when engaged by said first member to allow subsequent engagement of a finger having said first bias opposing rotation of said first member.

6. An operating mechanism for operating a circuit breaker having an operating handle, a pair of cooperable contacts and a maintaining means, said operating handle being operatively connected to said cooperable contacts to move said contacts to an engaged position responsive to motion of said operating handle to a first position and to move said contacts to a disengaged position repsonsive to motion of said operating handle to a second position, said maintaining means constructed to maintain said cooperable contacts engaged and said operating handle in said first position when said operating handle is moved thereto and to maintain said cooperable contacts disengaged and said operating handle in said second position when said operating handle is moved thereto and means to prevent motion of said operating handle past said first or said second position; and means responsive to predetermined conditions to move said contacts to a disengaged position and said operating handle to a third position; said operating mechanism comprising a reversible motor having an output shaft and connecting means constructed to connect said reversible motor shaft to said operating handle and an energizing means constructed to selectively energize said reversible motor to rotate said output shaft in a first or a second direction; said connecting means comprising a first member movable by said reversible motor output shaft and a second member removably engaged by said first member for a portion of its movement; said second member comprising first and second fingers, first and second biases, and a retaining plate; said first bias being mounted on said retaining plate; said first and second fingers each being pivotally mounted to said retaining plate in operative engagement with said first bias, said second bias being operatively engaged to said first and second fingers; said retaining plate being mounted on said operating handle, said first and second biases operatively maintaining said first and second fingers for engagement by said first member; said first biases being constructed to impart sufficient rigidity to said first finger to allow movement of said first member in said first direction to be transmitted to said operating handle for overcoming said maintaining means and moving said operating handle from said first to said second position, and to impart sufficient rigidity to said second finger to allow movement of said first member in said second direction to be transmitted to said operating handle for overcoming said maintaining means and moving said operating handle from said second to said first position said first biases having flexibility to allow said fingers to flex after said operating disconnection between said operating handle and said first member upon continued rotation of said first member; said second bias being constructed to impart sufficient flexibility to said fingers to allow said fingers to flex when engaged by said first member to allow subsequent engagement of a finger having said first bias opopsing movement of said first member; said operating handle being moved from said first position to said third position independently of said operating mechanism responsive to operation of said means responsive to predetermined conditions upon the occurrence of said predetermined conditions.

References Cited in the file of this patent

UNITED STATES PATENTS

| Re. 22,559 | Rowe | Oct. 24, 1944 |
| 1,858,242 | Hodgson | May 17, 1932 |
| 1,989,393 | Anderson | Jan. 29, 1935 |
| 2,103,416 | Gregory | Dec. 28, 1937 |
| 2,137,872 | Bogaerts | Nov. 22, 1938 |
| 2,200,570 | Zint | May 14, 1940 |
| 2,275,510 | Dietrich et al. | Mar. 10, 1942 |
| 2,343,807 | Schaefer | Mar. 7, 1944 |
| 2,533,040 | Petrak | Dec. 5, 1950 |
| 2,573,139 | Hoffman | Oct. 30, 1951 |
| 2,602,124 | Anderson | July 1, 1952 |